United States Patent Office 3,160,614
Patented Dec. 8, 1964

3,160,614
MOLECULAR WEIGHT REGULATION IN POLYMERIZATION OF VINYLIDENE MONOMERS USING UNSATURATED ALDEHYDES AS REGULATORS
Speros P. Nemphos and Robert L. Walter, Springfield, Mass., assignors to Monsanto Company, a corporation of Delaware
No Drawing. Filed Oct. 17, 1961, Ser. No. 145,773
6 Claims. (Cl. 260—85.5)

This invention relates to the polymerization of a free radical-polymerizable material including a polar monomer and more particularly relates to a method of regulating the molecular weights of polymers prepared by polymerizing such a free radical-polymerizable material in the absence of an organic diluent.

The tendency of certain free radical-polymerizable materials to polymerize to very high molecular weight polymers under normal polymerization conditions is already well known. These very high molecular weight polymers have the disadvantage of being difficulty processable, i.e., unable to be processed without the use of special processing equipment except at temperatures so high as to have a detrimental effect on the strength and color of the processed polymers.

Various techniques have been proposed for regulating the molecular weights of such polymers so as to make them more easily processable. One of these techniques is to conduct the polymerization in an organic diluent. This technique is effective as a means of lowering molecular weight, but it has the disadvantages of increased cost and inconvenience of separating the polymer from the organic diluent. Other proposed techniques avoid the disadvantages of solvent polymerization but have unfortunate disadvantages of their own, e.g., raising the polymerization temperature increases the danger of a runaway polymerization, and using a mercaptan as a chain transfer agent contributes a very unpleasant odor to the polymers.

An object of the invention is to provide more easily processed polymers of the type prepared by polymerizing a free radical-polymerizable material including a polar monomer.

Another object is to provide a novel process for regulating the molecular weights of such polymers without employing an organic diluent in the polymerization reaction mixture.

These and other objects are attained by conducting the polymerization of a free radical-polymerizable material including a polar monomer, as hereinafter more completely described, in the absence of an organic diluent and in the presence of 0.2–5%, based on the weight of the free radical-polymerizable material, of a molecular weight regulator which corresponds to the formula:

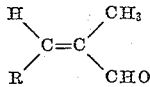

wherein R represents a hydrocarbon radical.

The following examples are given to illustrate the invention. Unless otherwise specified, quantities are mentioned on a weight basis, and polymer properties are determined under the same conditions in each part of any one example.

EXAMPLE I

Polyvinyl Chloride

PART A

Charge 100 parts of purified vinyl chloride monomer, 150 parts of water, 0.15 part of lauroyl peroxide, and 0.5 part of a water-soluble acrylic acid-2-ethylhexyl acrylate (90:10) copolymer to a suitable reaction vessel. Seal the vessel and tumble it in a constant temperature bath at 50° C. for 15 hours. The polymeric product has a specific viscosity of 0.540, measured as a solution of 0.25% of the polymer in cyclohexanone.

PART B

Repeat Part A except for including 0.5 part of tiglaldehyde in the charge to the reaction vessel. The polymeric product has a specific viscosity of 0.252.

PART C

Repeat Part A except for including 0.5 part of alpha-methylcinnamaldehyde in the charge to the reaction vessel. The polymeric product has a specific viscosity of 0.259.

EXAMPLE II

Methyl Methacrylate-Styrene Copolymer

PART A

Charge 50 parts of methyl methacrylate, 50 parts of styrene, 0.5 part of benzoyl peroxide, and 0.02 part of t-butyl peracetate to a suitable reaction vessel. Purge with nitrogen, seal the vessel, and heat at 80° C. for 5 hours and then at 120° C. for 3 hours. Purify the product by dissolving it in methyl ethyl ketone and then precipitating it in methanol. The polymer product has a specific viscosity of 0.149, measured as a solution of 0.1% of the polymer in dimethylformamide.

PART B

Repeat Part A except for including 1 part of alpha-methylcinnamaldehyde in the charge to the reaction vessel. The polymeric product has a specific viscosity of 0.137.

EXAMPLE III

Polyacrylonitrile

PART A

Charge 100 parts of purified acrylonitrile and 0.1 part of dicumyl peroxide to a suitable reaction vessel. Purge with nitrogen, seal the vessel, and heat at 130° C. for 4 hours. Dissolve the reaction product in dimethylformamide and precipitate it in methanol to isolate methanol-insolubles. The methanol-insoluble portion of the polymeric product has a specific viscosity of 0.447, measured as a solution of 0.1% of the polymer in dimethylformamide.

PART B

Repeat Part A except for including 1 part of alpha-methylcinnamaldehyde in the charge to the reaction vessel. The methanol-insoluble portion of the polymeric product has a specific viscosity of 0.323.

EXAMPLE IV

Acrylonitrile-Fumarate Copolymer

PART A

Charge 50 parts of acrylonitrile, 50 parts of dibutyl fumarate, and 0.1 part of dicumyl peroxide to a suitable reaction vessel. Purge with nitrogen, seal the vessel, and heat at 130° C. for 4 hours. Dissolve the reaction product in methyl ethyl ketone and precipitate it in methanol to isolate methanol-insolubles. The methanol-insoluble portion of the polymeric product has a specific viscosity of 0.130, measured as a solution of 0.1% of the polymer in dimethylformamide.

PART B

Repeat Part A except for including 1 part of alpha-methylcinnamaldehyde in the charge to the reaction vessel. The methanol-insoluble portion of the polymeric product has a specific viscosity of 0.106.

EXAMPLE V

Styrene-Acrylonitrile Copolymer

PART A

Charge 70 parts of styrene, 30 parts of acrylonitrile, 100 parts of water, 0.5 part of di-t-butyl peroxide, and 0.03 part of a water-soluble acrylic acid-2-ethylhexyl acrylate (90:10) copolymer to a suitable reaction vessel. Heat with agitation at 125° C. for 4 hours and then at 140° C. for 4 hours. Strip the bead slurry of unreacted monomers, wash, and dry. The polymeric product has a specific viscosity of 0.200 (measured as a solution of 0.1% of the polymer in dimethylformamide) and a Rossi-Peakes flow of 0.2 in./2 min. at 135° C. and 1500 p.s.i.

PART B

Repeat Part A except for including 1 part of alpha-methylcinnamaldehyde in the charge to the reaction vessel. The polymeric product has a specific viscosity of 0.092 and a Rossi-Peakes flow of 0.8 in./2 min.

EXAMPLE VI

Styrene-Acrylonitrile Copolymer

PART A

Charge a solution of 2 parts of sodium stearate in 150 parts of water to a suitable reaction vessel and heat to 95–100° C. with agitation. Continuously add a mixture of 80 parts of styrene and 20 parts of acrylonitrile to the heated, agitated soap solution over a period of 2 hours. During the addition of the monomer mixture, continuously add a separate charge consisting of a solution of 0.25 part of potassium persulfate in 50 parts of water. After completing the addition of the monomer and catalyst charges, strip the emulsion of unreacted monomers, coagulate, and dry. The polymeric product has a specific viscosity of 0.180 (measured as a solution of 0.1% of the polymer in dimethylformamide) and a Rossi-Peakes flow of 0.4 in./2 min. at 135° C. and 1500 p.s.i.

PART B

Repeat Part A except for adding 2 parts of tiglaldehyde together with the monomer charge. The product has a specific viscosity of 0.082 and a Rossi-Peakes flow of 0.9 in./2 min.

PART C

Repeat Part A except for adding 2 parts of alpha-methylcinnamaldehyde together with the monomer charge. The product has a specific viscosity of 0.122 and a Rossi-Peakes flow of 0.70 in./2 min.

The invention is a method of regulating the molecular weights of polymers prepared from a free radical-polymerizable material including a polar monomer without employing an organic diluent. The molecular weight regulation is achieved by conducting the polymerization of the free radical-polymerizable material in the presence of a minor amount of a molecular weight regulator which corresponds to the formula:

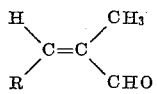

wherein R represents a hydrocarbon radical, preferably a phenyl radical or an alkyl radical containing 1–6 carbon atoms, e.g., alpha-methylcinnamaldehyde, tiglaldehyde, etc.

The amount of molecular weight regulator employed in the practice of the invention is in the range of 0.2–5%, usually 0.5–3%, based on the weight of the free radical-polymerizable material. The unsaturated compounds are ineffective as molecular weight regulators at concentrations lower than 0.2%. Concentrations higher than 5% are usually undesirable, either because the higher concentration causes too great a reduction of the molecular weight of the polymer or because the amount of molecular weight regulator which becomes chemically-combined into the polymer is large enough to noticeably affect polymer properties other than the properties attributable to molecular weight. A particular advantage of the molecular weight regulators of the invention is their ability to act as molecular weight regulators at such low concentrations that substantially their only contribution to the properties of the polymers prepared in their presence is an improvement in processability.

The free radical-polymerizable materials which are polymerized in the presence of the molecular weight regulators of the invention are materials including a polar monomer, i.e., a monomer which has a dipole moment of at least 1.0 Debye unit. Particularly suitable materials are:

(1) Polar vinylidene monomers, such as acrylonitrile, methacrylonitrile, vinyl chloride, an alkyl acrylate (e.g., methyl acrylate, ethyl acrylate, butyl acrylate, 2-ethylhexyl acrylate, dodecyl acrylate, etc.), an alkyl methacrylate (e.g., methyl methacrylate, butyl methacrylate, etc.), and mixtures thereof, (2) Mixtures of such polar vinylidene monomers with copolymerizable monomers, such as dialkyl maleates, dialkyl fumarates, acrylic acid, methacrylic acid, conjugated dienes (e.g., butadiene), monovinylidene aromatic hydrocarbons (e.g., styrene, alpha-methylstyrene, alpha-ethylstyrene, o-, m-, and p-methylstyrenes, o-, m-, and p-methyl-alpha-methyl-styrenes, p-isopropylstyrene, ar-dibutylstyrenes, vinyl naphthalene, etc.), and (3) Mixtures of non-polar vinylidene monomers with one or more copolymerizable polar compounds other than the polar monomers mentioned above, such as mono- or dialkyl maleates or fumarates, maleic anhydride, acrylic acid, methacrylic acid, etc.

A polar monomer should comprise at least 10% of the weight of the free radical-polymerizable material. According to one of the preferred embodiments of the invention, the free radical-polymerizable material consists of 10–90% by weight of one or more monovinylidene aromatic hydrocarbons and 90–10% by weight of acrylonitrile and/or methacrylonitrile.

The polymerization of the free radical-polymerizable material in the presence of a molecular weight regulator of the invention is conducted in the absence of an organic diluent. Polymerization may be accomplished by any of the mass, suspension, or emulsion polymerization techniques conventionally employed for the polymerization of such materials, usually at temperatures in the range of 30–200° C. at atmospheric or superatmospheric pressure. The reaction mixture should contain a free radical polymerization initiator, such as a peroxy or azo compound, and any ingredient required by the particular polymerization technique employed, e.g., water, an emulsifying agent, a suspending agent, etc. Optional ingredients, such as antioxidants, plasticizers, etc., can also be included in the reaction mixture if desired.

A preferred embodiment of the invention is the use of the molecular weight regulators in polymerization reactions which are conducted in an aqueous medium. Ordinarily in such reactions the weight ratio of water to free radical-polymerizable material is in the range of 9:1 to 2:3. The emulsifying agent, when employed, can be of the anionic, cationic, or non-ionic type; the suspending agent, when employed, can be inorganic or organic.

It is within the scope of the invention to conduct the polymerization in the presence of a preformed polymer, e.g., polybutadiene, a rubbery butadiene-styrene copolymer, or the like, to graft polymeric chains of the free radical-polymerizable material onto the preformed polymer backbone. The molecular weight regulator serves to shorten the chains grafted onto the polymer backbone as well as to lower the molecular weight of any coformed, ungrafted polymer of the free radical-polymerizable material.

The products of the invention are polymers which contain a minor amount of chemically-combined molecular weight regulator and have lower molecular weights than the corresponding polymers prepared in the absence of the molecular weight regulators. Because of their lower molecular weights, they are more easily processable and can be processed, e.g., extruded, molded, etc., in conventional processing equipment without requiring the use of extreme temperatures which would have a detrimental effect on the strength and color of the products.

The invention is particularly advantageous in that it accomplishes molecular weight regulation without the aid of organic diluents, malodorous mercaptans, or reactive materials which would have to be used in such large amounts as to have a noticeable effect on other polymer properties as well as on processability.

It is obvious that many variations can be made in the products and processes set forth above without departing from the spirit and scope of this invention.

What is claimed is:

1. In a process for polymerizing a free radical-polymerizable material of the group consisting of (a) a polar vinylidene monomer of the group consisting of acrylonitrile, methacrylonitrile, vinyl chloride, an alkyl acrylate, an alkyl methacrylate, and mixtures thereof, (b) mixtures of said polar vinylidene monomer with a copolymerizable monomer of the group consisting of a dialkyl maleate, a dialkyl fumarate, acrylic acid, methacrylic acid, a conjugated diene, a monovinylidene aromatic hydrocarbon, and mixtures thereof, and (c) mixtures of a non-polar vinylidene monomer with a copolymerizable polar monomer of the group consisting of a monoalkyl maleate, a monoalkyl fumarate, a dialkyl maleate, a dialkyl fumarate, maleic anhydride, acrylic acid, methacrylic acid, and mixtures thereof in the presence of a free radical polymerization initiator, the improvement which comprises conducting the entire polymerization in the presence of 0.2-5%, based on the weight of the free radical-polymerizable material, of a molecular weight regulator which corresponds to the formula:

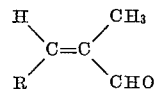

wherein R represents a hydrocarbon radical of the group consisting of a phenyl radical and an alkyl radical containing 1–6 carbon atoms.

2. The process of claim 1 wherein the free radical-polymerizable material is vinyl chloride.

3. The process of claim 1 wherein the free radical-polymerizable material is acrylonitrile.

4. The process of claim 1 wherein the free radical-polymerizable material consists of 10–90% by weight of a monovinylidene aromatic hydrocarbon and 90–10% by weight of acrylonitrile.

5. A process as in claim 1 wherein the polymerization is conducted in an aqueous medium.

6. A process as in claim 1 wherein the molecular weight regulator is tiglaldehyde.

References Cited in the file of this patent
UNITED STATES PATENTS 2,616,887    Danzig et al.             Nov. 4, 1952
3,110,702    Delacretaz             Nov. 12, 1963